United States Patent [19]

Bogatzki

[11] 4,279,242

[45] Jul. 21, 1981

[54] SOLAR COLLECTOR ASSEMBLY

[76] Inventor: Hans-Ulrich Bogatzki, Ferdinand-Hodler-Str. 24, Zürich, Switzerland

[21] Appl. No.: 146,023

[22] Filed: May 2, 1980

Related U.S. Application Data

[63] Continuation-in-part of Ser. No. 948,246, Oct. 3, 1978, Pat. No. 4,222,372.

[30] Foreign Application Priority Data

Oct. 14, 1977 [CH] Switzerland .................... 012617/77

[51] Int. Cl.$^3$ ........................ F24J 3/02; F28F 1/00; B65D 21/00
[52] U.S. Cl. .................................. 126/443; 126/438; 138/113; 138/149; 165/177; 215/10; 285/DIG. 12
[58] Field of Search ............... 126/442, 443, 450, 438; 165/135, 177, 178; 215/10; 285/DIG. 12; 138/113, 149

[56] References Cited

U.S. PATENT DOCUMENTS

| | | | |
|---|---|---|---|
| Re. 29,833 | 11/1978 | Mlavsky | 126/443 |
| 1,345,758 | 7/1920 | Folsom | 126/443 |
| 3,125,091 | 3/1964 | Sleeper | 126/443 |
| 4,011,858 | 3/1977 | Hurkett | 126/443 |
| 4,084,577 | 4/1978 | Rhodes | 126/443 |
| 4,091,793 | 5/1978 | Hermann et al. | 126/441 |
| 4,094,300 | 6/1978 | Young | 126/442 |
| 4,119,085 | 10/1978 | Knowles et al. | 126/443 |
| 4,129,119 | 12/1978 | Yoke | 126/438 |
| 4,144,931 | 3/1979 | Medico | 165/135 |
| 4,148,296 | 4/1979 | Parlato | 126/450 |
| 4,149,523 | 4/1979 | Boy-Marcotte et al. | 126/438 |
| 4,151,828 | 5/1979 | Mather et al. | 126/443 |
| 4,162,093 | 7/1979 | Sigmund | 138/149 |
| 4,222,372 | 9/1980 | Bogatzki | 126/443 |

FOREIGN PATENT DOCUMENTS

| | | | |
|---|---|---|---|
| 2280036 | 3/1976 | France | 126/443 |
| 481787 | 3/1938 | United Kingdom | 215/10 |
| 869392 | 5/1961 | United Kingdom | 215/10 |

Primary Examiner—Daniel J. O'Connor
Attorney, Agent, or Firm—Frishauf, Holtz, Goodman & Woodward

[57] ABSTRACT

Individual collector cells are fitted together in series along a tube through which a heat transfer medium flows. Each cell has a cylindrical housing shell with openings at both ends offset from the cylindrical axis and bordered by flanges, so that the narrow opening of one cell may fit into the wider opening of the next, with a gasket in between. Thus, the two cells joined at the junction may be supported on the tube that passes through both. The half of the cylindrical shell on the side of offsetting of the openings is provided with a reflecting surface, either coated on the outside of the shell or provided in one way or another on the inside. The assembly of cells may be adjusted by rotating about the tube so that the direction of arrival of sunlight is perpendicular to the mirror aperture. The individual shells are made by making a bottle on a bottle-making machine, with the closed end of the bottle being formed in such a way that by scoring a circle and applying a sharp blow, a disk may be knocked out to provide the second opening.

4 Claims, 13 Drawing Figures

SOLAR COLLECTOR ASSEMBLY

This application is a continuation-in-part of my prior application, Ser. No. 948,246, filed Oct. 3, 1978, which matured into U.S. Pat. No. 4,222,372.

The present invention relates to a collector arrangement for a solar energy heating system in which many cell elements cooperate with pipes for the passage of a heat exchange medium.

Solar energy constitutes an ideal energy source for substitution for oil fuel. Quite apart from the fact that solar energy is available free and in unlimited quantities, it is characterized by having no harmful effects on the environment. A further important advantage is that it can be used on a completely decentralized basis. However, it must be remembered that this energy can only be obtained by day and, in part, only with direct solar radiation. Account must also be taken of the fact that solar energy only has a relatively low intensity, particularly with clouded skies, when only the much less intense diffused rays can be used.

A number of commercially usable systems for using solar energy for heating purposes are already known. In particular, a so-called solar cell system has been adopted, a distinction being necessary between flat cells and focussing cells.

In the case of flat cells, the basic construction is always essentially the same. A generally metallic flat body is provided with a radiation-absorbing surface which generally consists of black lacquer or some similar material. Pipes or ducts are placed in or on the body. Through the pipes or ducts circulates a heating exchange medium which conveys away the heat trapped by the absorbing surface. This heat can be used either directly or indirectly for heating purposes.

Since, according to the Stefan-Boltzmann law, each black body also emits thermal radiation whose intensity rises proportionally to the fourth power of its temperature, the cells are covered with one or more layers of glass or plastic. These glass or plastic layers are not transparent for the wavelength range of the rays emitted by the cell, so that the partly reflected rays are largely absorbed by the glass or plastic layers, where they are converted into heat, leading to the so-called hothouse effect.

The back of the cell is provided with a sufficiently thick insulating layer, so that only very small losses occur here.

To make the ratio between absorption and emission more favorable, in more sophisticated flat cells the black surface is replaced by a so-called selective surface. Selective surfaces have the advantage that the solar radiation is absorbed very well and emission is very small.

Flat cells have a number of advantages. Thus, they are able to convert even diffuse radiation into thermal energy. In addition, there is a good efficiency up to a heating medium temperature of 60° C. (Celsius). Furthermore, the flat cells are relatively inexpensive and simple to install.

However, reference must also be made to certain of the disadvantages of flat cells. A particular disadvantage is the poor efficiency in the high temperature range, temperatures above 100° C. (Celsius) being very difficult to obtain. Even in the case of optimum alignment of the cells relative to the sun, i.e. its position at midday, there is a particularly strong reflection from the flat covering plates in the morning and evening, due to the very acute angle of incidence, so that efficiency drops. This is very disadvantageous because, other than at night, it is particularly in the morning and evening that thermal energy is required. It is also very difficult to obtain an air-tight seal for the space between cell and covering layer. Moist air frequently enters this space and leads to fogging of the panes of glass, so that efficiency drops. The ideal solution would be a high vacuum in this space. However, due to the relatively large areas, even a low vacuum would cause the panes of glass to break. To obtain good efficiency, the cell surface must be aligned as precisely as possible with the mean solar position. However, in the case of house roofs which do not have this optimum position and inclination, installation is difficult or efficiency is low. For numerous reasons it is unlikely that a sail-like installation of the cells would be permitted. In addition, as the cells are generally only made in certain sizes, it is difficult to adapt them to particular roof shapes.

In the case of focussing solar cells, the incident solar radiation is focussed onto a point, line, or surface by means of an optical system, e.g. a mirror or lens system. In the case of solar cells for heating purposes, generally cylindrical-parabolic mirrors are used in which the incident rays are concentrated on a line. Rotationally symmetrical parabolic mirrors are less frequently encountered.

Cylindrical parabolic mirrors are readily made from glass, to the back of which is applied a thin silver coating. The absorber is generally constituted by a black metal tube or a glass-covered black metal tube, a glass tube with a black liquid which is simultaneously used as a heat carrier medium, or a special metal profile surrounded by a glass tube. A number of telescoped glass tubes could also be used, one being provided with a selective absorber coating and the underlying glass tube serving as a supply and discharge tube for the heat carrier medium.

An important feature of the focussing cells is the concentration factor. This factor C forms the ratio of the admission surface of the cell to the absorber surface. The higher the factor C, the higher the temperature to which the carrier medium can be heated.

Advantages of focussing cells are, inter alia, that very high temperatures can be obtained as a function of the concentration factor. In the case of indirect further use, the temperature level is a measure for good efficiency. It is also advantageous that the emission and convection losses are much lower than with flat cells, due to the small absorber surface compared with the admission surface.

It is disadvantageous that focussing cells only operate with direct solar radiation, and must therefore follow the sun, which requires an additional mechanism. In addition, they are expensive to maintain and can only be installed on suitable roofs, preferably flat roofs. It is very difficult to install them on inclined house roofs. Their wind pressure sensitivity is a further disadvantage. They are also relatively costly, sizes cannot be varied as desired, due to their standard, and cannot be individually adapted readily to special requirements.

SUMMARY OF THE INVENTION

The problem to which the present invention is directed is to provide a system of cells combining at least the most important advantages of flat cells and focussing cells, while avoiding their disadvantages and which are particularly easy to manufacture and inexpensive, while permitting the widest possible range of applications.

According to the present invention the cell elements are bottle-shaped hollow bodies of glass or plastic, which can be placed in any desired number in juxtaposed manner around a tube passing through them and whose faces can be braced relative to one another, whereby the wall of the hollow body is spaced from and surrounds the tube while the tube is located to pick up a maximum concentration of solar energy.

Thus, such a cell element has only a neck and a base with an opening, the base being able to receive the neck or shoulder of a further hollow body in a manner to assure alignment end-to-end. To provide adequate stability, the opening in the base can be bounded by an inwardly extending annular flange, but this feature is not necessary.

Such cell elements can be manufactured in an inexpensive manner in a glassworks by a bottle manufacturing process.

The cell system is then constructed in such a way that a plurality of tubes, in each case carrying a plurality of cell elements, are arranged parallel to one another with a spacing corresponding approximately to the largest width of one cell element. Adjacent tube ends are elastically interconnected by tube bends or hoses. It is also possible for the tubes carrying the cell elements to be interconnected in an articulated manner to form a Venetian blind-like arrangement, as shown in FIG. 7 of my aforementioned patent.

That aforesaid patent issued on my prior application Ser. No. 948,246, of which this application is a continuation-in-part, was directed particularly to a cell system of the kind described above in which each cell unit has a hollow cylindrical housing made from a material which is transparent to solar radiation and comprises a shell having seamless cylindrical walls of a cross-sectional shape constituted by two curves of different curvature concave towards each other and merging together at the curve ends. The present application is directed to other similar systems of cells, in a first one of which each cylindrical shell has the cross-sectional shape of a right circular cylinder centered on an axis which is offset with respect to the axis of the tube which passes through the housings that are disposed end to end and engaged in each other for mutual support and for support on the tube. In a second kind of system of cells according to the invention, the cells fit together end-to-end on their sloping (conical) shoulders and support each other by being pressed together by flanged hubs bearing on the end cells, while the bottle necks do not fit on the central tube, but have a small clearance therefrom. The present application is also directed to a method of manufacture of such cells and of assemblies of such cells which is also applicable to manufacture of some kinds of cells of structures within the scope of my aforesaid U.S. patent.

Briefly, this method of manufacture involves fabrication of the shell of transparent material for the cell unit on a bottle-making machine with a first opening of the completed shell unit being formed as the mouth of the bottle, as made on the bottle-making machine. The bottom of the bottle so made has a shape on which it is easy to score and break out the second opening of the completed shell. For assembling the shell units on the tube, the end with the wider opening is seated on a gasket that fits between it and the forwardly extending end of another cell unit. In one version of the assembly method, the neck around the narrower cell opening fits on the central tube. In another version, the cell assemblies (line-ups) are pressed between conical flanges at the respective ends of each assembly and the central tube passes down through the line-ups of cells with a small clearance at each cell-to-cell joint, being centered by packings in the flanged hub at each line-up end.

BRIEF DESCRIPTION OF THE DRAWINGS

The structure and the method of making of cell units in accordance with the present invention is further described with reference to the annexed drawings in which.

DETAILED DESCRIPTION OF PREFERRED EMBODIMENTS AND METHOD OF MANUFACTURE

Figure 1:
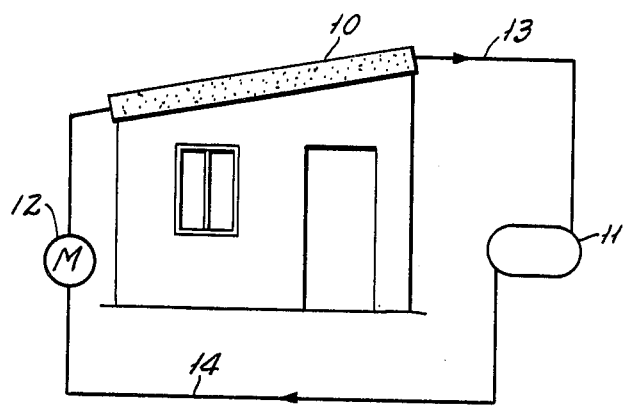
FIG. 1 is a diagram of a dwelling equipped with a solar energy collector which may be a collector utilizing the structure according to the present invention.

In the solar energy heating system diagrammatically illustrated in FIG. 1, water as the heat exchange medium, is heated under the action of the sun in a cell system 10, preferably installed on the roof of a house, the water then being fed to a heat-consuming means 11 in the form of a heating system, via a flow line 13. The water flow is driven by a circulating pump 12 into the return flow line 14 of the circuit system.

In this way it is possible to connect a large number of further consuming means into the system. The consuming means can be of very varied types, e.g., hot water boilers and, in particular, swimming pools.

Figure 9:
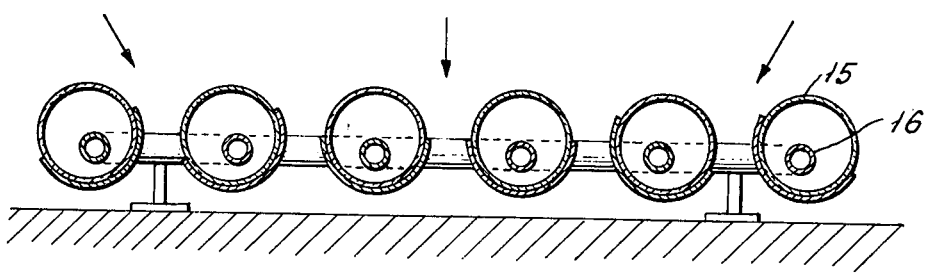
FIG. 9 is a diagram, in cross-section, of a disposition of linear cell assemblies that is particularly useful.
Figure 5:
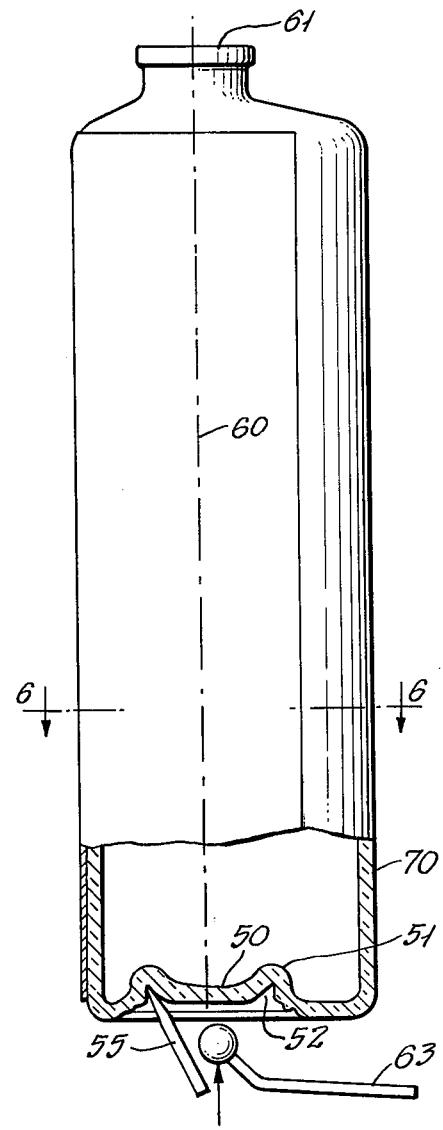
FIG. 5 is a longitudinal view, partly in section, of another form of cell unit for use in a collinear array of cell units, in its condition prior to making the wider opening of the shell of said cell unit, with indication of tools utilized in producing that opening.
Figure 6:
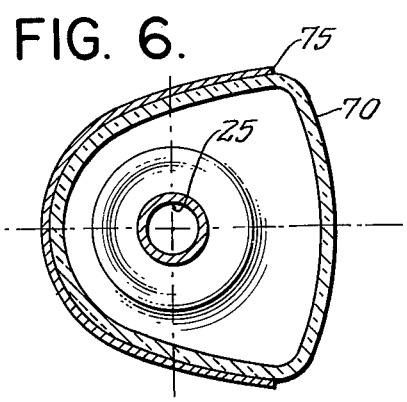
FIG. 6 is a diagrammatic cross-section of the cell unit illustrated in FIG. 5 when mounted on a central tube in the manner illustrated in FIG. 3A.
Figure 7A:
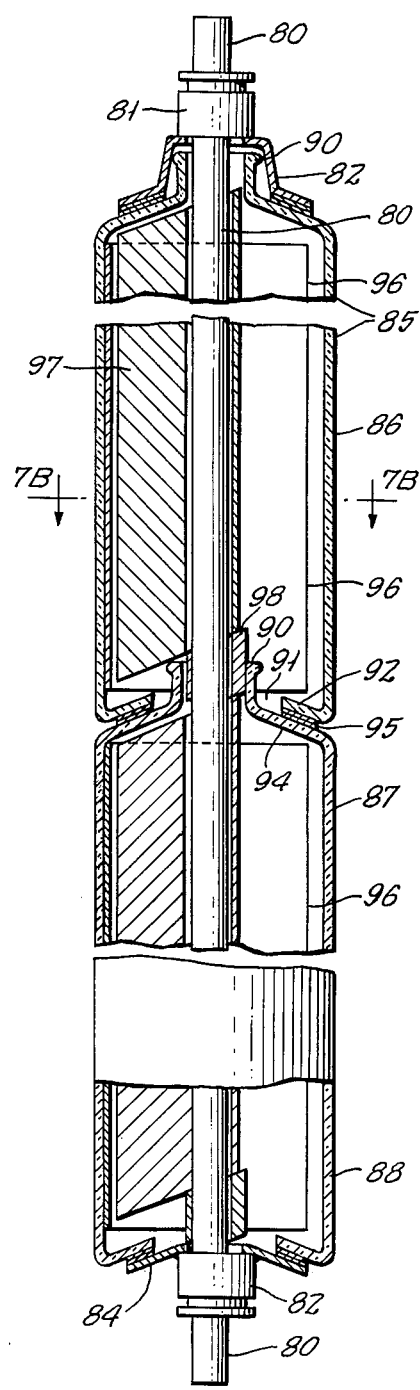
FIG. 7A is a diagrammatic longitudinal section of another form of cell assembly in which there is a clearance between the cell units and the central tube, the figure being limited to showing a cell junction and the two end-supporting flange hubs.
Figure 7B:
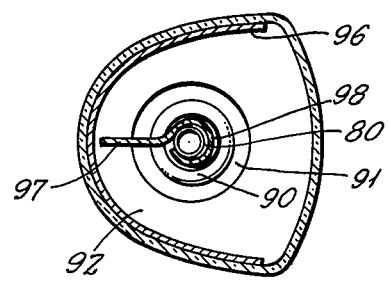
FIG. 7B is a diagrammatic cross-section along the line 7B—7B of FIG. 7A.
Figure 8A:
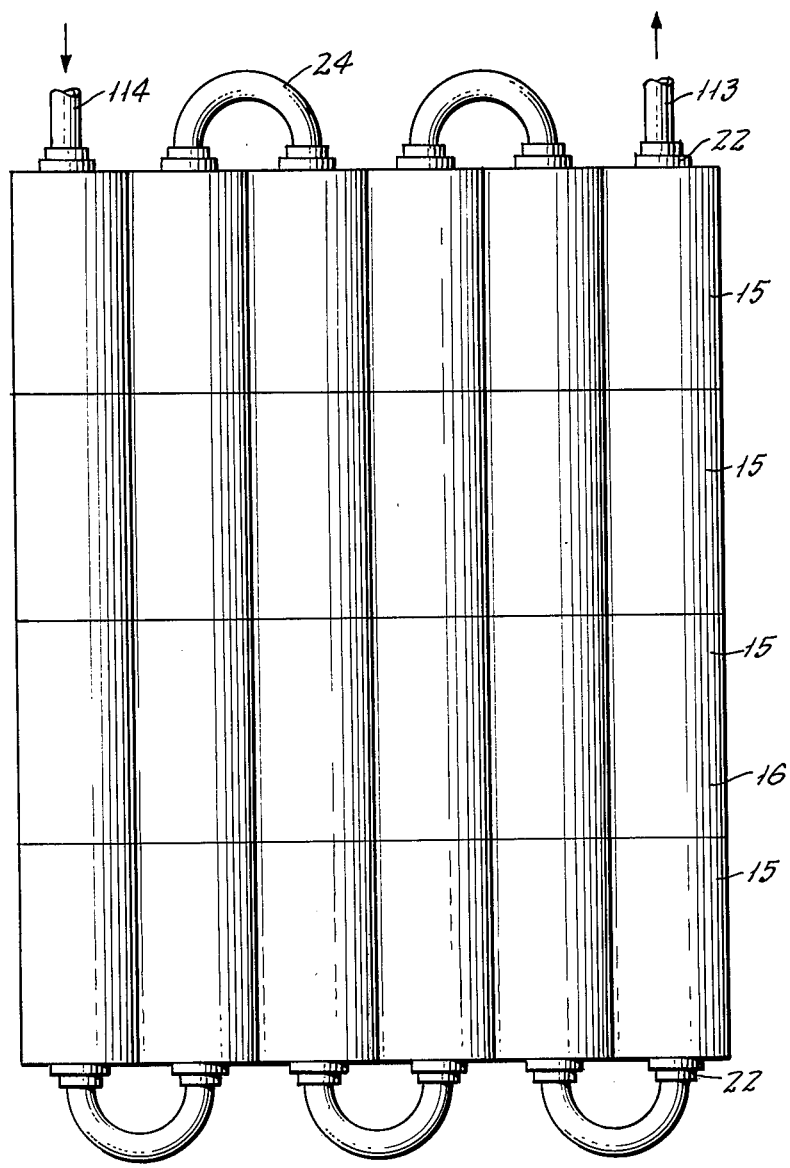
FIG. 8A is a diagrammatic plan view, and FIG. 8B an associated end view, of an array of collinear assemblies of cell units forming a solar energy collector according to the invention.
Figure 8B:
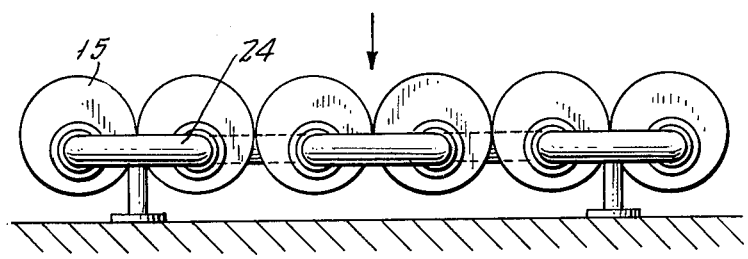

FIGS. 2A, 2B, 3A, 3B and 4 illustrate one form of cell system alternative to the kind of cell system to which my aforesaid patent was directed. FIGS. 7A and 7B illustrate another form of cell system which has more recently become a more preferred cell system and is likewise an alternative for the kind of cell system to which my aforesaid patent was directed. FIGS. 5 and 6 illustrate a method of manufacture of the cells usable for both of the aforesaid cell systems and illustrated with reference to a cell system of the kind to which my patent was directed and, finally, FIGS. 8A, 8B and 9 illustrate, with reference to the cell system of FIGS. 2-4 ways in which collinear assemblies of cells of any of the systems illustrated may conveniently be organized into larger assemblies for use in an insulation of the kind illustrated in FIG. 1.

Figure 2A:
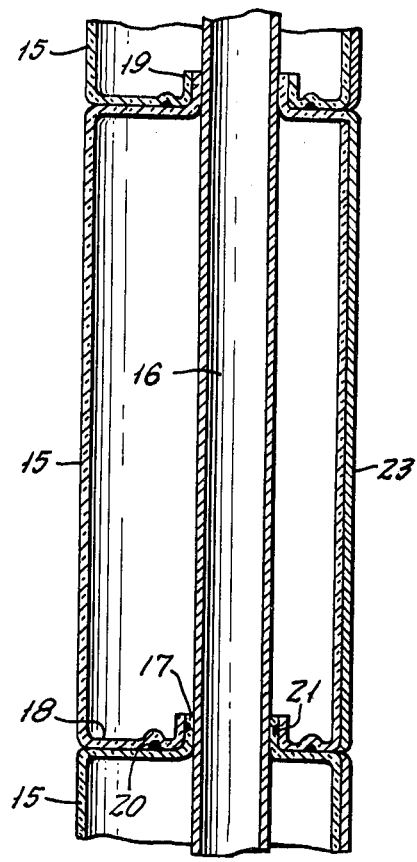
FIG. 2A is a diagrammatic longitudinal cross-section of a portion of collinear assembly of cell units forming part of a solar collector.
Figure 2B:
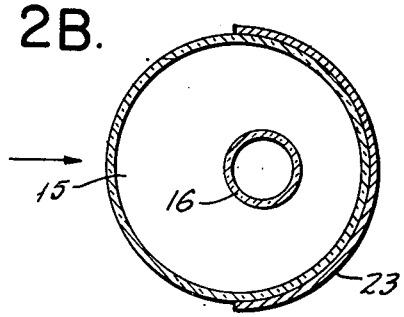
FIG. 2B is an end view of the collector shown in FIG. 2A.

In all of the cell systems here referred to, the cell elements are formed by more or less bottle-shaped hollow bodies made from glass or plastic, which can be fitted together end-to-end in any desired number around a central tube through which a heat transfer medium, such as water, is circulated. In FIGS. 2A and 2B, the bottle-shaped bodies 15 are found mounted on a central tube 16. Each hollow body 15 has a neck 17 with an internal diameter that just clears the external diameter of the tube 16. In FIG. 2A and likewise in FIG. 3A, no clearance is shown in the drawing, but it is to be understood that a clearance sufficient for a resilient gasket or coating on the inside of the bottle neck could, and normally should, be provided for this type of embodiment.

The external walls of the neck 17 of each body in FIG. 2A is provided with a groove for a resilient gasket 21 in the form of an O-ring between the neck 17 and the upturned flange of the bottom 18 of the adjacent cell body. The external surface of the bottom wall 18 likewise has a groove for a gasket 20.

In this embodiment, the cylindrical walls of the body 15 are of circular cross-section and the center of that cross-section is offset from the axis of the tube 16. The semi-cylindrical portion of the body 15 that contains a central tube 16 has an outer reflective coating 23 that concentrates the light incident from the direction shown by the arrow in FIG. 2B so that most of it passes through the interior of the tube 16.

Figure 3A:
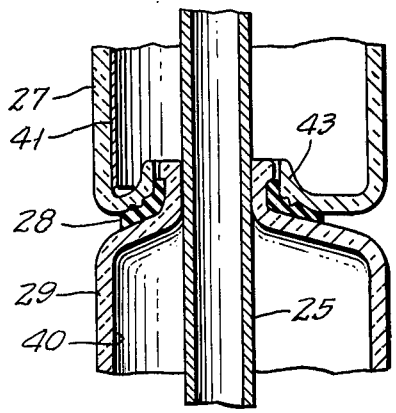
FIG. 3A is a longitudinal cross-section of a junction of two cell units mounted on the central tube.
Figure 3B:
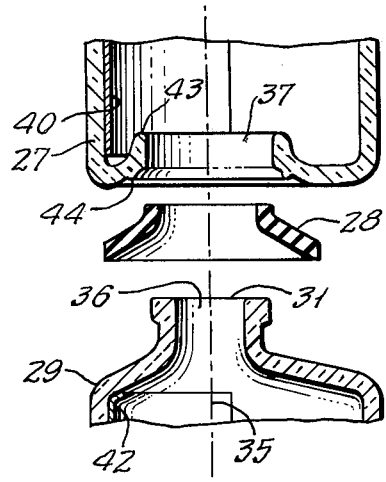
FIG. 3B is an exploded view of the cell ends and gasket of FIG. 3B, omitting the central tube.

A variation of this cell assembly is illustrated in FIGS. 3A and 3B in which the shoulders of the bottle-like cells just below the bottle neck are sloping instead of perpendicular to the axis and a single gasket 38 is shown instead of the two gaskets 20 and 21. In this case the reflecting surface 40 is provided on the inner wall 41 of the bottle-shaped bodies 27 and 29.

The reflecting coating 23 of FIGS. 2A and 2B and 40 of FIGS. 3A and 3B is preferably a silver coating applied directly to the transparent cylindrical wall or, particularly if the transparent wall is of plastic, to a metalized surface first produced thereon over the portion to be silvered.

A suitable metallized coating can also provide sufficient reflectivity without silvering. To prevent metallized coatings from being damaged by the weather, they are additionally covered or sealed by a top coating (not shown in the drawings), preferably of long life and weather-resistant plastic. This plastic coating which, should be understood to be part of the layer 23 of FIGS. 2A and 2B also serves as an insulating coating.

The hollow bodies 15 of FIG. 2A, for example, can be placed in any desired number of a corresponding long tube 16 and can be held together by end flanges 22 (FIG. 8A) which can be screwed onto the tube ends, so that a closed system is formed in such a way that the hollow cell bodies surround the tube 16 as a continuous glass wall spaced from the tube 16.

Depending on the size of hollow body 15 and the diameter of the tube 16, a particular desired concentration factor can be obtained. The tube 16 should be located somewhat less than half-way between the axis of the cylindrical walls and the center line of the mirror surface. Due to the relatively large diameter of the tube as compared with the opening surface, the tube can be fitted with a relatively low level of precision. That rather poor focussing of a hemispherical mirror does not prevent the tube from collecting almost all the reflected rays. As mentioned above, an absorber element (not shown), such as a piece of blackened sheet metal is preferably fitted to the outside wall of the tube 16 closely enough for conductive heat transfer and this absorber is then cooled by water flow in the tube interior.

A further variant (not shown) for the reflection of rays can be provided by an elastic shield with a reflecting coating which, when compressed, can be inserted into the cylindrical cell elements, the shield being fixed in the particular element by springing back.

As can be gathered more particularly from FIG. 8A, the usual collector system is formed with a plurality of tubes 16, each carrying a plurality of cell elements. The tubes are arranged parallel to one another, preferably with a spacing which is approximately equal to the largest width of a cell element 15. Adjacent tube ends are interconnected by tube bends 24 or elastic hoses. This generally flat structure then has a continuous tube system with a connection 113 for the flow line 13 and a connection 114 for the return flow line 14 in FIG. 1.

It is thus possible to assemble cell systems which can be adapted to virtually any roof shape and which have a wide range of uses, as will be described in greater detail hereinafter.

A further important advantage is provided by this system for houses whose roofs do not happen to be in the optimum position relative to the sun. In this case, the cells are admittedly arranged in juxtaposed flat manner on the roof, but by simply rotating the opening plane of the individual cell elements 15 about the tube axis in the direction of the mean position of the sun, the efficiency can be significantly increased. Furthermore, through the convex shape of the hollow body surface, sloping incoming rays can be trapped much better than with flat cells.

As has been stated hereinbefore, due to the flat angle of incidence with flat cells the efficiency in the morning and evening is relatively poor and this is when, other than at night, the most thermal energy is required.

The present system can obviate this disadvantage in that, as shown in FIG. 9 a particular number of cell elements 15 is oriented more in one or the other direction. In addition, as a result of the convex sun-side halves 215 of hollow bodies 15, sloping incoming rays are much better trapped. Thus, a more uniform temperature gradient can be obtained throughout the day.

A further important advantage of the proposed system compared with prior art systems is obtained when it is installed on flat roofs. Whereas both the flat cell and the focussing cell must project from the roof surface to be oriented at the sun, according to the novel system the individual cell elements and an additional second roof membrane can be placed flat on the roof, so that only the opening planes of the individual cell elements have to be aligned with the mean solar position by rotating about the tube axis.

A further advantage of the present system is that it can also be usefully installed on vertical house or other masonry walls which face the sun. In this case, the cell axes are aligned parallel to the earth's surface and the mirror-aperture planes are aligned transverse to the mean direction of the sun by rotary adjustment about the tube axis. This system also acts as an additional wall and, in addition, functions as general weather-proofing, while also acting as additional thermal insulation.

A very important advantage of the present cell system is that it has both the main features of a flat cell and of a focusing cell. Thus, as a function of the ratio of the aperture plane to the tube diameter, a predetermined concentration factor can be obtained, so that the temperatures can be higher than those obtained with a flat cell. Furthermore, a larger proportion of diffuse radiant energy can be collected and converted into thermal energy.

In addition, such a cell system can be constructed so as to offer maximum resistance to aging and to the weather. The air can also be sucked out of the space between the tube and the hollow body and a vacuum produced in this space in advantageous manner. Such a cell system can also be extended or modified at any time and in simple manner. This is very important, because the requirements made on a heating system can constantly vary. Furthermore, all the components of the system can easily be produced in standard sizes and can be assembled by untrained people on a do-it-yourself basis. This is particularly significant from the cost angle for private householders. However, even if a person is undecided, his performance of a simple experiment can make a decision much easier, costs being very low. This will be a particular advantage during the initial introductory phase. Thus, the individual components can be sold by do-it-yourself chains and mail order houses, thus appealing to a much larger segment of the purchasing public.

If glass is used for the cell elements, these can be manufactured particularly inexpensively in a glassworks by a conventional bottle production process, as more fully described below in connection with FIGS. 5 and 6.

FIG. 3A shows the portion of the assembly of cells mounted in line on a tube 25 in the neighborhood of a junction between an upper unit shell 27 and a lower unit shell 29 which compress between them a gasket 28.

The lower portion of FIG. 3 shows, with omission of the tube 25 for simplification of the illustration, an exploded view of the joint. In this case the gasket 28 that fits between the shell 27 and the shell 39 is shown in its unstressed condition.

Figure 4:
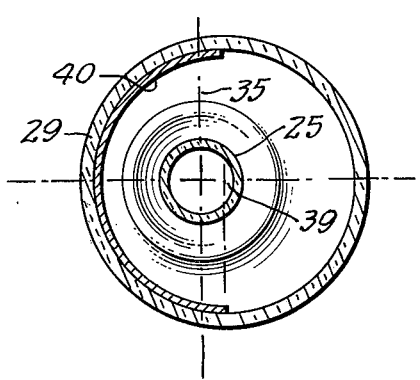
FIG. 4 is a diagrammatic transverse cross-section on the line 4—4 of FIG. 3A.

FIG. 4 shows a transverse cross-section of the assembly of FIG. 3A on the sectioning line 4—4,. It will be seen from FIG. 4 that the axis 35 of the tube 25 and of the openings 36 and 37 is offset from the axis of the cylindrical walls of the shells 27, 29 and 32, which is not shown in FIG. 3, but passes through the point 39 shown by an enlarged dot on FIG. 4. The offset of the axis 35 is toward the middle of the semi-cylindrical mirror provided by the metal coating 40, which is of semi-circular profile. This offset could be as much as half the radius of the cylindrical shell, thus halfway from the point 39 to the coating 40, but preferably it is substantially less, about a quarter of the radius and perhaps even a bit less than that. The focussing effect is somewhat better with the greater amount of offset, but the mechanics of manufacture and of the resulting structure are somewhat more convenient with the smaller amounts of offset.

The tube 25, like the tube 16 of FIG. 2, is normally fitted with an absorber (not shown).

FIG. 5 shows the manner in which the shell of a cell unit can readily be made from a blank blown on an automatic bottle-making machine, such as the machines made by the "Emhart" manufacturing machinery, for example. A bottle-like vessel is first blown on an automatic machine in the form illustrated in FIG. 5, with a re-entrant portion 50 of the bottom of the bottle surrounded by an internal ridge 51 into which a "V" channel 52 in the form of a ring is provided. Then the bottom of the annular "V" channel 52 is scored with a sharp tool 55, which may be done while the bottle is turned on the axis 60 of its mouthed opening 61, and thereafter the central disc of the re-entrant portion 50 is knocked out by a hammer tool 63 to form an opening like the opening 37 of the shell 29 of FIG. 3.

FIGS. 3A and 5 both show the desirability of providing a small annular ridge 44 on the bottom of the re-entrant flange 43 that remains (FIG. 3B) after the operation illustrated in FIG. 5 is performed. The small ridge 44 bites into the gasket 28,30.

FIG. 6 shows that the method described in connection with FIG. 5 can be utilized for making cells for solar collectors of the kind particularly described in my said U.S. Pat. No. 4,222,372 in which the walls of the shell 70 are composed of a parabolic portion 71 smoothly joined at its open end to another curved portion 72. The parabolic portion 71 carries the reflecting coating 75, in this case externally applied to the shell 70. The axis 60 is the focal line of the parabolic portion 71 of the shell 70. The coating does not need to be applied before the performance of the knockout procedure illustrated at the bottom of FIG. 5.

FIG. 6 shows the central tube 25 corresponding to the tube 25 of FIG. 4, although the tube 25 was not shown in FIG. 5, because that showed the shell before the wider opening in the shell had been made.

FIG. 7A shows a presently preferred form of solar energy collection system, according to the invention, in a longitudinal section through the plane of symmetry, of the reflection surface which has the shape of a parabolic cylinder. FIG. 7B is a transverse cross-section on the line 7B—7B of FIG. 7A.

In this embodiment, the central tube 80 is mounted at the end of the assembly in the flange hubs 81 and 82 by means of suitable annular layers of packing material between the internal diameter of the flange hubs and the external diameter of the tube 80. The flange hubs are preferably of metal and respectively hold metal mounting flanges 83 and 84 providing conically dished surfaces for compressing between them the reflector shells that are lined up in an end to end array surrounding the central tube 80.

In FIG. 7A parts of four shells 85, 86, 87 and 88 are shown, the rest of the array being omitted since it is necessary to show only the two ends of the array and a typical joint for complete description of the array. Typical dimensions are an outer diameter of 16 mm for the central tube; length of single shell, 32 cm; width (aperture) of shell, 11 cm; depth of shell 10 cm.

In this embodiment of the invention, there is clearance between the bottle mouth 90 of a shell and the central tube 80, and likewise the opening 91 in the bottom of the bottle-like shell provides a still larger clearance between the annular "bottom" 92 and the neck 93 of the adjacent shell that protrudes through the opening 91. The annular flange 92 is referred to as the "bottom" merely because in the process illustrated in FIG. 5 for manufacture of such shells, this flange was originally formed at the bottom of the bottle. The central tubes 80, are usually arranged horizontally.

The flange 92 has the same conical slope as the shoulders 94 through which the bottle mouth 90 protrude, so that one shell can be fitted on the next with an intermediate gasket 95, the arrangement being thus self-centering when the ends of the array are pushed together. The flanges 83 and 84 maintain the slight compression necessary to maintain the alignment, fitting against the shell units likewise with an intermediate gasket.

The shells are preferably made of high strength silicate glass, which provides high light transmission and a very long service life. This material is easily handled on bottle-making machinery, so that replacement shells for an array are not unduly expensive. The reflective metal lining 96 is provided on the inside of the cylindrically parabolic portion of the shell walls, in this case as a springy metal insert slightly rolled up to pass through the large opening 91 before it is allowed to spread over the cylindrically parabolic surface.

The central tube is preferably a metal tube with a blackened surface so that it will absorb incident solar radiation and readily give up heat to the liquid circulating through it. An absorber fin, likewise of blackened metal, is fastened thereon, which extends from the central tube towards the vertex line of the cylindrically parabolic reflector, leaving a small clearance between the end of the fin and the reflector surface. The fin 97 for each shell is mounted on the central tube by means of a wrap-around extension thereof, which may form an almost complete tube grasping the outer surface of the central tube 80.

The diameter of the opening 91 is large enough for insertion of the absorber fin and the tube 80 may be inserted into the wrap-around portion and pushed through it longitudinally in assembly. The ends of the fin 97 are cut obliquely so that they will run parallel to the slope of the shoulder 94 and the flange 92, respectively, of the shell. At the end of the absorber fin structure that is adjacent to the opening 91, there is preferably provided a tab 98 on the aperture side of the shell, which is to say on the opposite side of the fin 97 proper, that will project barely into the opening 91 and will engage the inside of the mouth 90 of the adjacent shell.

No attempt is preferably made to center the mouth 90 completely on the tube 80, such as could be done, for example, by providing two additional tabs like the tab 98 at 120° to the tab 98 because in practice the centering of the shell is adequately performed by the conically dished end surfaces fitting together. It will be noted from FIG. 7A that the centers of the bottle mouth 90 and the openings 91 and, hence, of the conically dished surfaces, are offset slightly toward the aperture side of the cells from the axis of the tube 80, which preferably passes through the focal line of the cylindrically parabolic reflector. Thus the tab 98 has a radial dimension that corresponds to the greatest clearance between the tube 80 and the inside of the bottle mouth 90.

The collector cells illustrated in FIGS. 7A and 7B accept radiation over an angle of 120°. The method of construction and sealing even lends itself to evacuation of the shells, which ends to pull such assemblies together and assists in compressing the sealing gaskets while, at the same time, allowing the operation of solar energy collection to take place at temperatures in excess of 100° C. This advantage is made available by the fact that, in the construction illustrated in FIG. 7A, spaces enclosed by the respective shells of an in-line array communicate through the bottle mouths 90, which have a clearance from the tube 80, allowing a single pump connected through one of the end flanges to draw a vacuum for the whole array.

Although the invention has been described with references to particular illustrative embodiments, it will be recognized that variations and modifications are possible within the inventive concept. For example, the shells of individual cell units can be made on a bottle-making machine which forms the wider opening of the shell as the bottle mouth, in which case the narrower opening will thereafter be produced by knocking out a disk at the other end of the bottle. As another example, if the reflecting surface is to be inside the cell housing, it may be easier to insert a spring-out folded metal reflector than to apply a metal coating over only part of the inside walls.

I claim:

1. A solar energy collector assembly comprising a plurality of individual collector cells mounted in series along a tube which carries a circulating heat transfer medium, each of said cells having a hollow cylindrical housing made from a material which is transparent to solar radiation capable of being absorbed by said heat transfer medium, said housing comprising a shell having a cylindrical wall and end walls respectively having first and second apertures both centered on a focal axis offset from the axis of said cylindrical walls, said end walls each carrying an annular flange extending axially in the same direction and surrounding the aperture of the end wall on which the flange is carried, said second aperture being of a size to admit the flange of the first aperture of another cell housing as well as a gasket fitting between the aperture-surrounding flanges, said assembly including such a gasket between each pair of end-to-end adjacent cell housings, said cylindrical wall of each housing shell supporting a concave reflector of the shape of a cylinder parallel to said tube, disposed around said tube on the side of the cell which is in the direction of the offset of said focal axis with respect to said cylindrical wall axis and is open to the other side of the cell.

2. A solar energy collector as defined in claim 1, in which each said reflector is constituted by a reflecting metal layer of substantially semi-circular cylindrical shape on a surface of the cylindrical wall of a cell housing.

3. A solar energy collector as defined in claim 2, in which said layer is on the outside surface of said cylindrical wall.

4. A solar energy collector as defined in claim 2 in which said layer is on the inside surface of said cylindrical wall.

* * * * *